US 6,568,626 B2

(12) United States Patent
Fontaine

(10) Patent No.: US 6,568,626 B2
(45) Date of Patent: May 27, 2003

(54) EYEPIECE-SUPPORT ARM ASSEMBLY DEVICE ON AN AIRCRAFT SUCH AS A ROTARY AIRCRAFT

(75) Inventor: Bernard Fontaine, Villebon sur Yvette (FR)

(73) Assignee: Aerospatiale Matra Missiles, Paris (FR)

( * ) Notice: Subject to any disclaimer, the term of this patent is extended or adjusted under 35 U.S.C. 154(b) by 0 days.

(21) Appl. No.: 09/888,601

(22) Filed: Jun. 26, 2001

(65) Prior Publication Data

US 2002/0008174 A1 Jan. 24, 2002

(30) Foreign Application Priority Data

Jul. 3, 2000 (FR) .............................. 00 08629

(51) Int. Cl.⁷ ................................ B64D 47/00
(52) U.S. Cl. ................... 244/1 R; 244/129.1; 359/351; 359/404; 285/40 R; 138/106
(58) Field of Search ................ 244/1 R, 17.11, 244/129.1; 138/106; 359/843, 351, 359, 401–402, 404; 285/112, 365, 409, 331; 24/271, 273, 279

(56) References Cited

U.S. PATENT DOCUMENTS 1,156,782 A * 10/1915 Jenkins
1,185,487 A * 5/1916 Eastman
2,689,141 A * 9/1954 Kiekhaefer
2,963,942 A * 12/1960 Montremy
4,112,557 A * 9/1978 Salomon
4,600,277 A 7/1986 Murray, Jr.
4,643,460 A * 2/1987 Lieberg
5,364,379 A * 11/1994 Ozenne et al.
5,367,408 A 11/1994 Corsan et al.
5,793,541 A * 8/1998 Cattan et al. ............... 359/402
6,339,497 B1 * 1/2001 Piere et al. ................. 359/403

FOREIGN PATENT DOCUMENTS

DE 950 522 C 11/1956
DE 44 04 388 C1 11/1994
GB 2 253 020 A 8/1992

* cited by examiner

Primary Examiner—Galen L. Barefoot
(74) Attorney, Agent, or Firm—Thelen Reid & Priest LLP; Robert E. Krebs

(57) ABSTRACT

An Eyepiece-support arm assembly device on an aircraft. The device comprises flanges formed on the eyepiece-support arm and on a support attached to the aircraft, along with a retention belt (32) liable to be set to a locking status, wherein the arm is immobilised in relation to the support, a setting status, wherein the arm can be moved between a position for use and a retracted position, and a disassembly status allowing the assembly and disassembly of the eyepiece-support arm, without modifying the setting. The status is changed by operating levers (44, 46).

8 Claims, 4 Drawing Sheets

EYEPIECE-SUPPORT ARM ASSEMBLY DEVICE ON AN AIRCRAFT SUCH AS A ROTARY AIRCRAFT

This application claims priority under 35 U.S.C. §§119 and/or 365 to 00 08629 filed in France on Jul. 3, 2000; the entire content of which is hereby incorporated by reference.

1. Field of the Invention

The invention relates to a device for the assembly of an eyepiece-support arm on a fixed support attached to the lower unit of a sight system, such as the sighting head of a fire control system, on an aircraft.

The invention particularly relates to the sight means of a fire control system equipped on a rotary aircraft. However, it may be used on any other type of aircraft, without leaving the scope of the invention.

2. State of the Related Art

The sight means of a helicopter fire control system comprise a sighting head essentially located outside the helicopter cell. More specifically, the main part of the sighting head unit is generally located above the roof of the cell. A lower part of the sighting head unit, compact in size, is housed under the roof of the cell, in the cockpit. Said lower part forms a fixed support on which an eyepiece-support arm is mounted.

The eyepiece-support arm assembly device is designed to enable said arm to move between a position for use, wherein it projects downwards in the cockpit and a retracted position, wherein the arm is folded upwards against the roof of the aircraft. This device is also designed to enable locking of the eyepiece-support arm either in its position for use, or in its retracted position.

In addition, it is desirable to be able to disassemble the eyepiece-support arm, for example during a night flight of the helicopter. Indeed, in this case, the pilot frequently wears night vision binoculars which are liable to strike the arm and damage it.

As illustrated schematically in FIG. 1 of the appended figures, the devices currently used to assemble an eyepiece-support arm onto a fixed support attached to the lower unit of a helicopter fire control system sight system generally comprise a retention belt 01 circling the flanges formed on the arm and on the support, respectively.

The retention belt 01 is composed of two half-collars 02 and 03, wherein two adjacent ends are articulated together by a pivot 04. A toggle joint mechanism connects the other two ends of the half-collars 02 and 03. This mechanism comprises a lever 05 articulated on the second end of one 02 of the half-collars, a threaded rod 06 articulated on the lever 05 and a nut 07 normally fastened onto the threaded rod 06. Said rod is inserted into a slot 08 formed in the second end of the other half-collar 03, where it is held by a pin 09.

In such a device, precise setting is performed, by fastening the nut 07 to a varying degree on the threaded rod 06, so that the eyepiece-support arm is locked perfectly when the lever 05 is retracted against the half-collar 02 supporting it, while being free to rotate around the axis of the retention belt 01 when the lever 05 is switched downwards. The eyepiece-support arm can then be moved from its position for use to its idle position, or conversely.

In this known arrangement, the eyepiece-support arm can be disassembled by unfastening the nut 07 completely, in order to open the retention belt 01. Indeed, it is only when this operation has been carried out that the clearance between the belt and the flanges formed at the ends of the arm and the support is sufficient to release the arm.

The need to unfasten the nut 07 completely to disassemble the eyepiece-support arm represents a number of problems.

A first problem relates to the need to perform a new setting of the position of the nut on the threaded rod when the eyepiece-support arm is put back in place. Given the precision required for this setting, this operation may take some time, which represents a considerable drawback in the case of an emergency intervention.

Another problem relates to the fact that pilots frequently wear gloves. Therefore, the nut 07 unfastening operation is difficult to carry out. It may result in the loss of the nut, which may fall into the back of the cockpit, where it represents a foreign element liable to interfere with the numerous items of equipment located in the cockpit, such as the flight controls.

DESCRIPTION OF THE INVENTION

The invention specifically relates to an eyepiece-support arm assembly device, wherein the original design enables a person wearing gloves to disassemble the arm, when required, without modifying the setting of the retention belt in its locking status and eliminating any risk of a foreign body falling in the cockpit.

According to the invention, this result is obtained by means of an eyepiece-support arm assembly device on a fixed support attached to the lower unit of a sight system, on an aircraft, the device comprising flanges formed on the eyepiece-support arm and on the fixed support, respectively, and a retention belt capable of circling the flanges around a common axis, the retention belt integrating locking means capable of being set to a locking status, wherein the eyepiece-support arm is immobilised in relation to the fixed support and a setting status, wherein the eyepiece-support arm is capable of rotating around said common axis, in relation to the fixed support, characterised in that the locking means of the retention belt are also capable of being set to an eyepiece-support arm disassembly status, the status being changed between the locking status, setting status and disassembly status without any setting.

Due to the fact that the locking means of the retention belt are originally designed to be able to be set to an arm locking status, an arm setting status and an arm disassembly status, it becomes possible to disassemble the arm without modifying the setting making it possible to keep the arm in its locking status. In addition, said disassembly is performed without removing any parts, such that it may be performed by a person wearing gloves without any risk of a foreign body falling into the back of the cockpit.

According to a preferred embodiment of the invention, the retention belt comprises two half-collars wherein two adjacent ends are articulated together by a first pivot and two second adjacent ends connected by locking means.

In this case, the locking means preferentially comprise two levers, wherein each is articulated on the second end of a corresponding half-collar by a second pivot, and a connection rod articulated on each of the levers by a third pivot.

The second pivot and the third pivot of the first of the levers are then advantageously separated by a first distance such that switching of the first lever around the second pivot changes from the locking status to the setting status. Comparably, the second pivot and the third pivot of the second lever are advantageously separated by a second distance such that switching of the second lever around the second pivot changes from the locking status to the disassembly status, at least when the first lever is also switched. Preferentially, the second distance is greater than the first.

To enable the setting of the circumferential length of the blocking belt in its locking status, the connection rod integrates, preferentially, length setting means.

In this case, the length setting means advantageously comprise a double-threaded nut, fastened to two threaded rods articulated on levers by the third pivots.

BRIEF DESCRIPTION OF THE FIGURES

As a non-restrictive example, a preferred embodiment of the invention will now be described, in relation to the appended figures, wherein.

DETAILED DESCRIPTION OF A PREFERRED EMBODIMENT OF THE INVENTION

Figure 2:
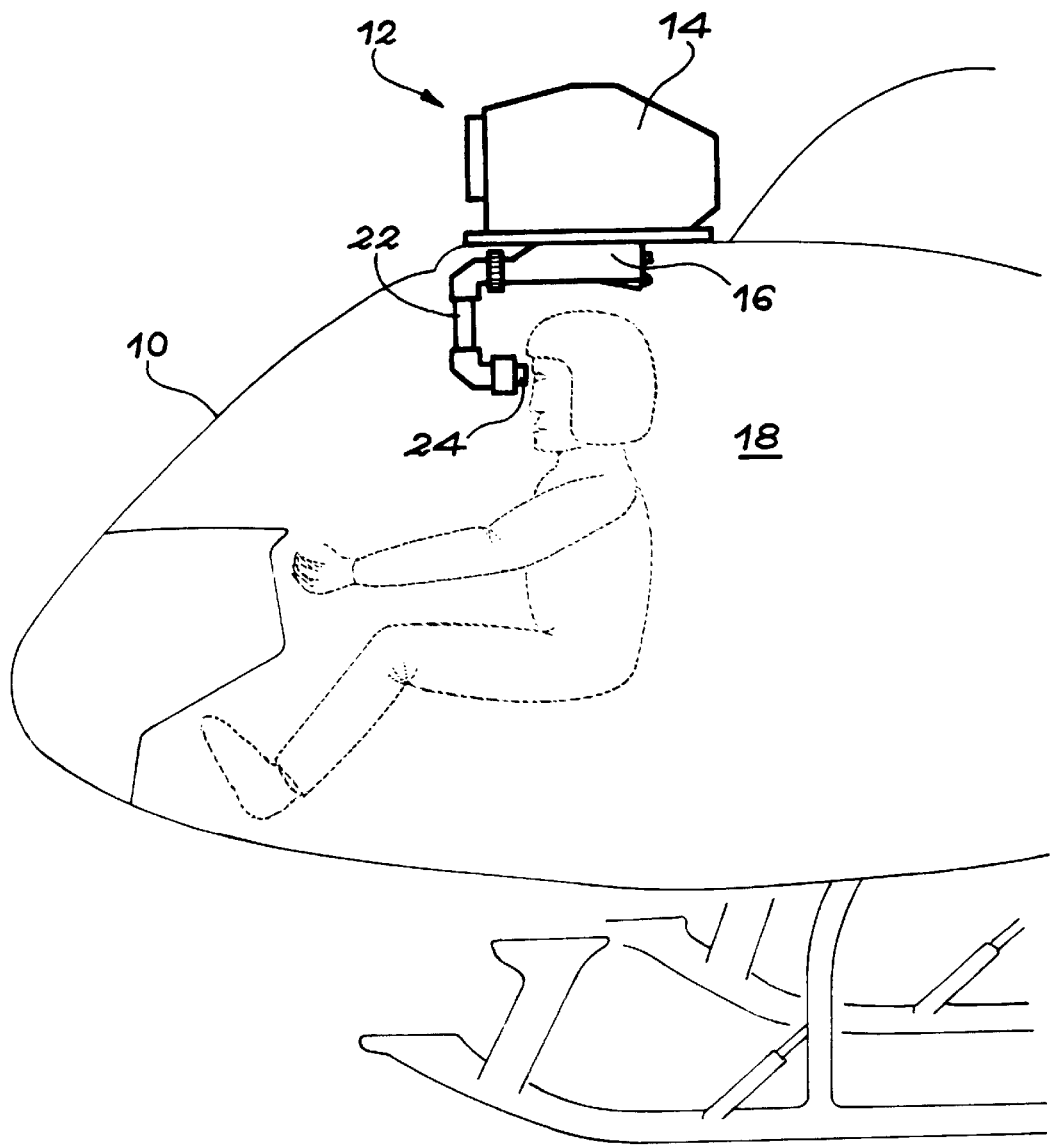
FIG. 2 represents schematically the front of a helicopter equipped with a sighting head wherein the eyepiece-support arm is attached to the sight system unit by an assembly device according to the invention.

In FIG. 2, the front part of a helicopter is represented. The roof of the cell 10 of said helicopter supports a sighting head 12 of a fire control system (not shown).

The sighting head 12 comprises a main external part 14 located above the roof and an internal part 16 placed inside the cockpit 18.

The internal part 16 essentially comprises the lower unit of the sight system of the sighting head 12. Said unit is attached to a fixed support 20 (FIG. 3) used to assemble an eyepiece-support arm 22 equipped with an eyepiece 24 at its end. More specifically, the eyepiece-support arm 22 is assembled on the fixed support 20 by an assembly device 26 in compliance with the invention.

Figure 1:
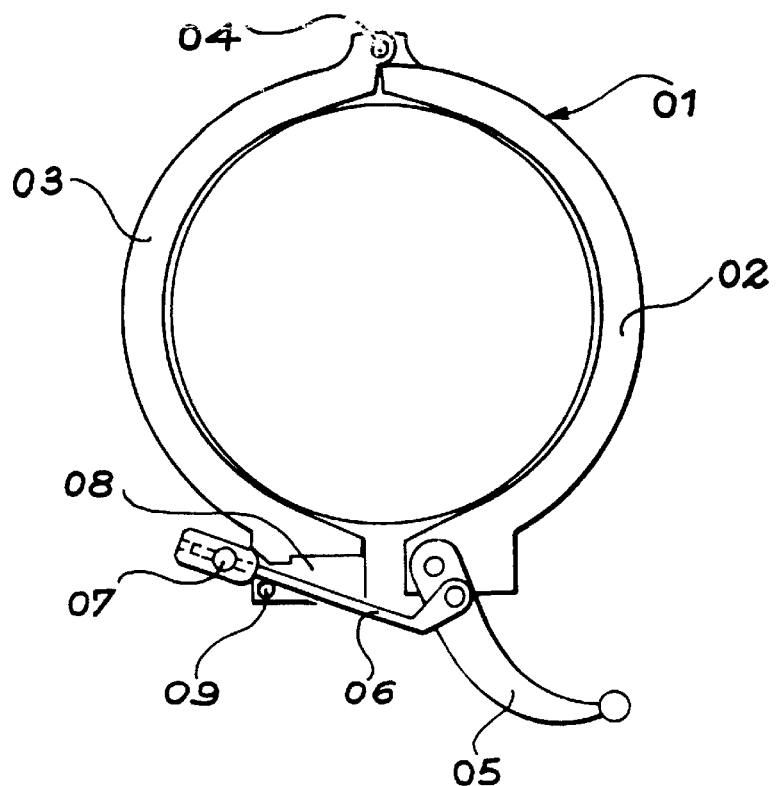
FIG. 1, already described, is a transverse section view representing an eyepiece-support arm assembly device according to the prior art.
Figure 3:
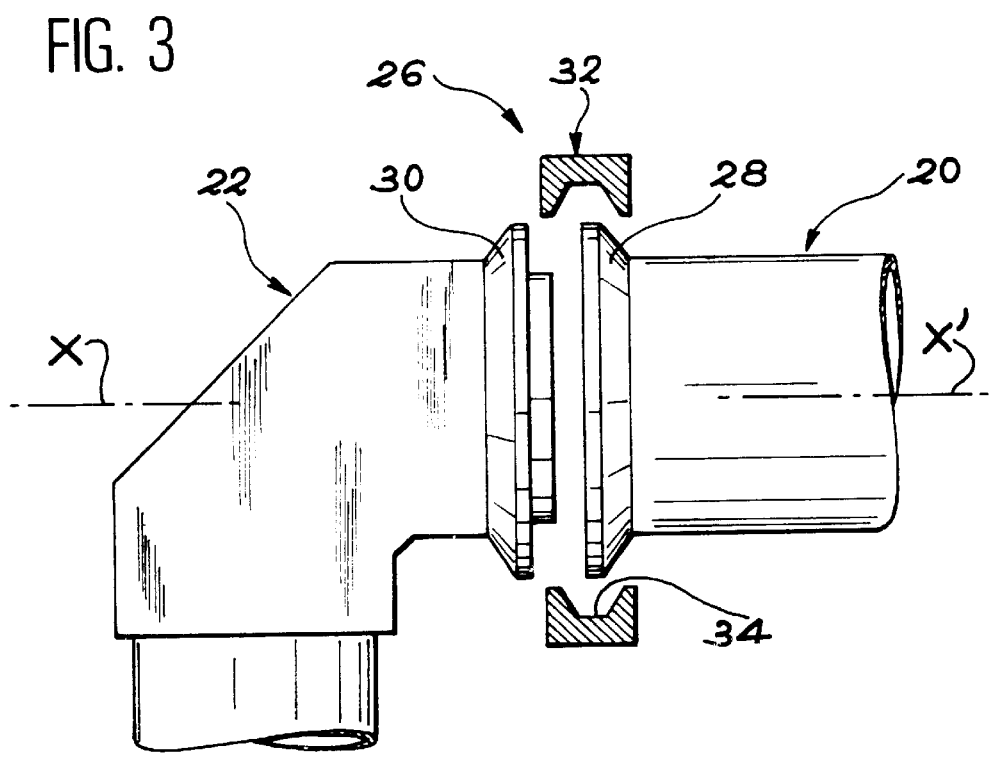
FIG. 3 is a side view, representing the assembly device at a larger scale.

As illustrated in particular in FIG. 3, in their connection zones adjacent to the assembly device 26, the fixed support 20 and the eyepiece-support arm 22 each comprise a tubular shaped part, wherein the common X—X' axis is approximately horizontal.

A flange 28 is formed at the end of the tubular part of the fixed support 20 and a flange 30 is formed at the end of the tubular part of the eyepiece-support arm 22. These flanges 28 and 30 are capable of being connected to each other by a retention belt 32, to form the assembly device 26 with said belt.

The facing faces of the flanges 28 and 30 show complementary shapes, such that the tubular part of the eyepiece-support arm 22 is automatically centered and aligned on the tubular part of the fixed support 20, along the X—X' axis, when the arm 22 is connected to the support 20 by the assembly means 26.

The opposite faces of the flanges 28 and 30 show tapered shapes, complementary to the sides of a groove 34 formed in the retention belt 32. More specifically, the arrangement is such that tightening the belt on the flanges makes it possible to immobilise the eyepiece-support arm 22 in relation to the fixed support.

Figure 4:
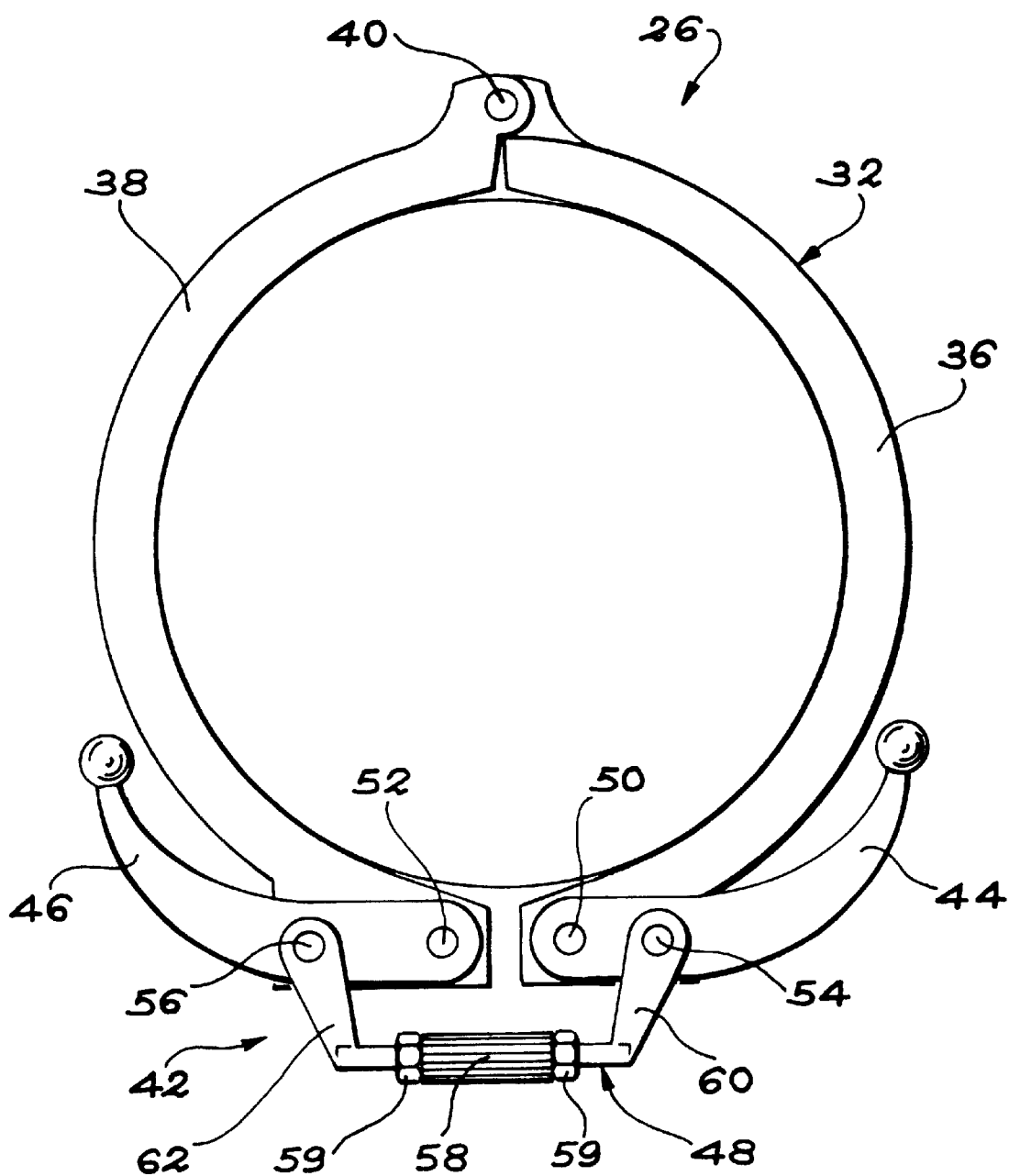
FIGS. 4 to 6 are section views comparable to FIG. 1, which represent the assembly device according to the invention in its locking status, in its setting status and in its disassembly status, respectively.

As illustrated particularly in FIG. 4, the retention belt 32 comprises two semicircular half-collars 36 and 38, wherein two first adjacent ends are articulated together by a pivot 40. More specifically, the pivot 40 is oriented parallel to the X—X' axis and supported by the fixed support 20, above the flanges 28 and 30.

The other two adjacent ends of the half-collars 36 and 38 are located under the flanges 28 and 30 and attached together by locking means 42.

In the embodiment shown, the locking means 42 comprise a double toggle joint mechanism comprising a first lever 44, a second lever 46 and a connection rod 48, of adjustable length.

The first lever 44 is articulated on the lower end of the half-collar 36 by a pivot 50 oriented parallel to the X—X' axis. The second lever 46 is articulated on the lower end of the half-collar 38 by a pivot 52, also oriented parallel to the X—X' axis. Finally, the ends of the connection rod 48 are articulated on the levers 44 and 46, respectively, by pivots 54 and 56 oriented parallel to the X—X' axis.

In the arrangement described above, the distance separating the pivots 52 and 56 is greater than the distance which separates the pivots 50 and 54. Consequently, pivoting the lever 46 by a given angle around its pivot 52 results in a greater variation in the diameter of the retention belt 32 than pivoting the lever 44 by the same angle around its pivot 50.

In the embodiment shown, the connection rod 48 comprises a double-threaded nut 58, such as a tensioning device, wherein the two ends are fastened respectively on a first threaded rod attached to an arm 60, articulated on the lever 44 by the pivot 54, and on a second threaded rod attached to an arm 62, articulated on the lever 46 by the pivot 56.

In an alternative embodiment not shown, which corresponds to the case where the tolerances of the parts require no setting, the connection rod 48 is of fixed length and therefore does not integrate length setting means.

The retention belt 32 according to the invention may be set to three different statuses, according to the positions of the levers 44 and 46.

A first status, referred to as the "locking status", is illustrated in FIG. 4. In said locking status, the two levers 44 and 46 are folded upwards against the half-collars 36 and 38, respectively. The retention belt 32 then tightens the two half-collars 36 and 38 closely such that the eyepiece-support arm 22 is immobilised or locked in relation to the fixed support 20. When the length setting means, such as the double threaded 58 in FIG. 4, are provided, said means are set once only during the first installation of the eyepiece-support arm 22. The setting is held by lock nuts 59 although it remains possible to modify the setting at a later stage, exceptionally, the setting is not affected by successive disassemblies and reassemblies.

Figure 5:
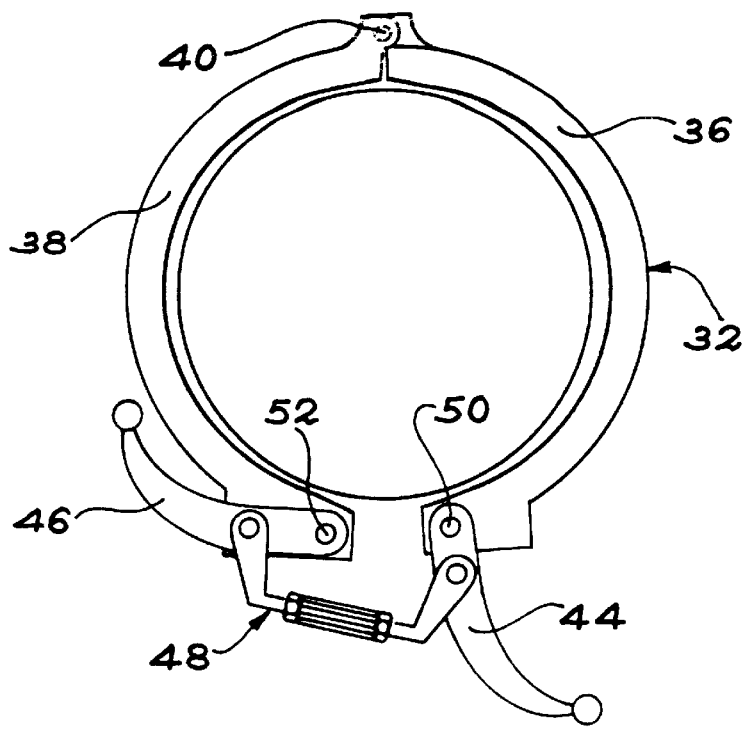

The second status, referred to as the "setting status", is illustrated in FIG. 5. The setting status is obtained by switching the lever 44 downwards, around the pivot 50. It produces between the retention belt 32 and the flanges 28 and 30 sufficient clearance to enable the eyepiece-support arm 22 to rotate freely around the X—X' axis, while remaining sufficiently low to eliminate any risk of the arm falling accidentally.

Figure 6:
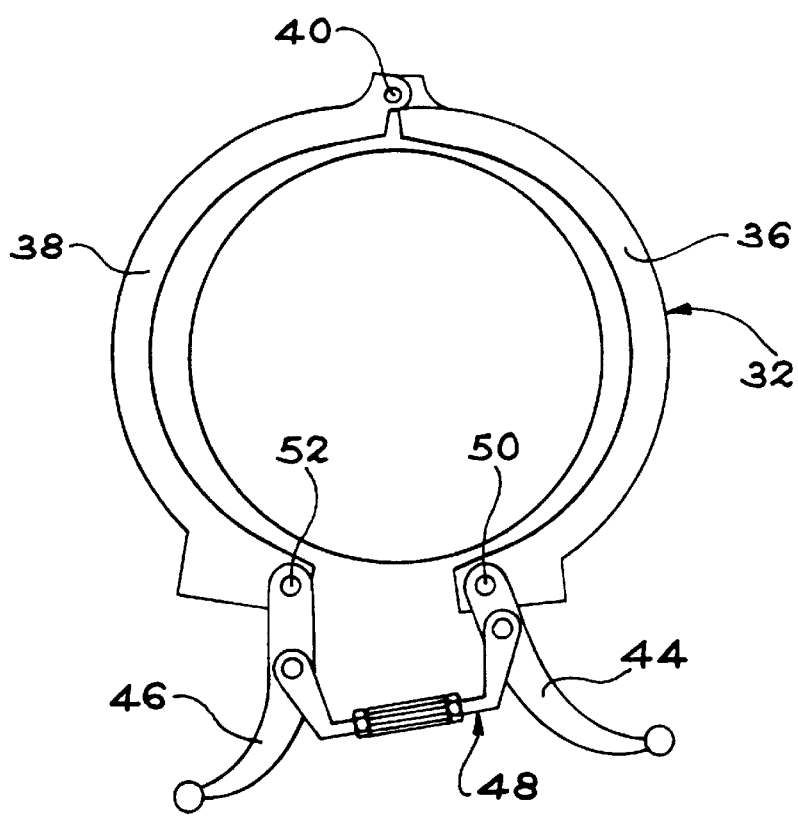

Finally, the third status, referred to as the "disassembly status" is illustrated in FIG. 6. In this status, the lever 46 is switched downwards around the pivot 52. The lever 44 can then either remain in the upper position as illustrated in FIG. 4, or also be switched downwards around the pivot 50, as shown in FIG. 6. The inner diameter of the retention belt 32 increases sufficiently so that the arm can be disassembled or, on the contrary, reassembled. This operation is carried out without changing the length setting of the connection rod 48.

As indicated above, this even makes it possible to use a connection rod with no length setting means, if permitted by tolerances.

Naturally, the invention is not restricted to the embodiment described above as an example. In this way, as already mentioned, the adjustable length connection rod may be replaced by a rigid connection rod of constant length. More generally, the locking means 42 may be composed of any mechanism capable of being switched between three predetermined statuses corresponding to the locking, setting and disassembly statuses defined above, by operating one or more lever type devices, without requiring any setting.

What is claimed is:

1. Eyepiece-support arm assembly device on a fixed support attached to the lower unit of a sight system, on an aircraft, the device comprising flanges formed on the eyepiece-support arm and on the fixed support, respectively, and a retention belt capable of circling the flanges around a common axis, the retention belt integrating locking means capable of being set to a locking status, wherein the eyepiece-support arm is immobilized in relation to the fixed support and a setting status, wherein the eyepiece-support arm is capable of rotating around said common axis, in relation to the fixed support, characterized in that the locking means of the retention belt are also capable of being set to an eyepiece-support arm disassembly status, the status being selectively changeable between the locking status, setting status and disassembly status without any setting of the locking means.

2. Device according to claim 1, wherein the retention belt comprises two half-collars wherein two adjacent ends are articulated together by a first pivot and two second adjacent ends connected by said locking means.

3. Device according to claim 2, wherein the locking means comprise two levers, wherein each is articulated on the second end of a corresponding half-collar by a second pivot, and a connection rod articulated on each of the levers by a third pivot.

4. Device according to claim 3, wherein the second pivot and the third pivot of the first of the levers are separated by a first distance such that switching of the first lever around the second pivot changes form the locking status to the setting status, and the second pivot and the third pivot of the second lever are advantageously separated by a second distance such that switching of the second lever around the second pivot changes from the locking status to the disassembly status, at least when the first lever is also switched.

5. Device according to claim 4, wherein the second distance is greater than the first.

6. Device according to claim 3, wherein said connection rod integrates length setting means.

7. Device according to claim 6, wherein the length setting means comprise a double-threaded nut fastened onto two threaded rods articulated on the levers by the third pivots.

8. Device according to claim 5, wherein said connection rod integrates length setting means.

* * * * *